United States Patent Office 3,267,116
Patented August 16, 1966

3,267,116
PROCESS FOR PREPARING PIGMENTARY COPPER PHTHALOCYANINE
Juergen Hans Braun, Brandywine Hundred, Del., assignor to E. I. du Pont de Nemours and Company, Wilmington, Del., a corporation of Delaware
No Drawing. Filed June 11, 1963, Ser. No. 286,952
6 Claims. (Cl. 260—314.5)

This invention relates to the preparation of copper phthalocyanine compounds and more particularly to novel methods for enhancing the pigmentary quality of such compounds. More specifically, it relates to a new method for conditioning copper phthalocyanine compounds to pigments of excellent strength and color intensity. Pigment strength, as used herein, means the tinting strength of the pigment and can be measured, for example, by its ability to color a white pigment dispersion following the procedure of American Society for Testing Materials (ASTM) test D–387–52–T.

The principal object of the invention is to provide a new process for enhancing the pigmentary quality of copper phthalocyanine compounds, particularly with respect to tinctorial characteristics and pigmentary strength. A further object is to provide a new acid-swelling process for conditioning copper phthalocyanine compounds to pigmentary quality. A still further object is to provide a low cost procedure for converting copper phthalocyanine compounds to the pigmentary state. Other objects and achievements of this invention will appear as the description proceeds.

Copper phthalocyanine compounds as conventionally synthesized are not suited for optimum use as pigments without conditioning to increase pigment strength and tinctorial quality. The principal conditioning methods used are: (1) acid pasting, which involves dissolving the copper phthalocyanine compound in sulfuric acid, followed by regeneration of the copper phthalocyanine compound in small particle size form by diluting the acid solution with water; (2) milling the copper phthalocyanine compound with steel shot, salt, or other solid grinding agent, either dry or in a liquid, optionally in the presence of a phase-converting liquid, followed by removal of the grinding agent; (3) acid-swelling, which comprises slurrying a copper phthalocyanine compound with an acid solution capable of forming a salt with the copper phthalocyanine compound, but insufficiently concentrated to dissolve the copper phthalocyanine compound, and regenerating the copper phthalocyanine compound in pigmentary form by hydrolysis of the salt; and (4) various combinations of methods (1), (2), and (3). A particularly advantageous method, with respect to both pigment quality and cost, comprises milling followed by acid swelling, wherein the milling conditions the pigment so that it is particularly well adapted to quality enhancement by acid swelling to yield a product of excellent tinctorial quality and dispersibility.

Conventional acid-swelling processes involve stirring copper phthalocyanine with sulfuric acid of concentration insufficient to effect solution but sufficient to bring about a change in crystal structure and particle size. This method is described, for example, in FIAT Final Report No. 1313 (PB-85172), vol. III, "Dyestuff Research, German Dyestuffs and Dyestuff Intermediates, Including Manufacturing Processes, Plant Design and Research Data," p. 298.

I have now found that certain copper phthalocyanine compounds can be improved in tinctorial quality and pigmentary strength by a simple procedure involving slurrying the compound in aqueous concentrated hydrochloric acid and hydrolyzing the reaction product to regenerate the respective copper phthalocyanine compound.

It will be noted that the treatment of copper phthalocyanine with hydrogen chloride followed by regeneration of the pigment from the resulting salt has been practiced in the art heretofore. But the treatment there was limited to anhydrous conditions, using an organic solvent, and the object there aimed at or achieved was of an entirely different character, namely the production of a non-flocculating pigment. (U.S. 2,524,672.) In the instant invention, however, aqueous hydrochloric acid is employed and the result, surprisingly, achieved is the conversion of a crude or coarsely crystalline copper phthalocyanine compound into one which has pigmentary qualities; that is, it is subdivided into extremely fine crystals which possess unusually high tinctorial strength.

Accordingly, this invention comprises reaction of a copper phthalocyanine compound with hydrochloric acid of a selected high concentration and regeneration of the copper phthalocyanine compound in pigmentary form by hydrolysis of said reaction product.

The invention is set forth more completely in the examples which follow, wherein all parts are by weight unless otherwise specified. These examples are intended to be merely illustrative of the invention and not in limitation thereof.

Example I

Crude copper phthalocyanine, predominantly in the $\alpha$-phase and containing approximately 2.5% chlorine (prepared, for instance, in known manner by the reaction of a mixture of suitable amounts of 4-chlorophthalic acid, phthalic anhydride, urea and copper (II) chloride in the presence of an appropriate catalyst and a suitable liquid carrier) is dry milled as described in U.S. 3,017,414 as follows: 18 parts of the copper phthalocyanine compound is charged to a ball mill containing about 1000 parts of "Cyl-Pebs" (steel rods approximately $\frac{5}{8}'' \times 1''$). The size of the mill should be such that the full charge of pigment and grinding elements occupies approximately 60–65% of the total volume of the mill. The mill is rotated at about 70% of the critical speed (i.e., the speed at which the centrifugal force overcomes the force of gravity so that the grinding elements are retained against the outer wall of the mill) for about 6 hours. The dry powder is discharged from the mill through a suitable screen to retain the "Cyl-Pebs."

One part of the above dry powder is slurried at room temperature in 2 parts of commercial concentrated hydrochloric acid containing approximately 37% hydrogen chloride. A green color is formed upon contact of the acid with the copper phthalocyanine, providing visual evidence of chemical reaction. The green acid slurry is maintained at room temperature for 4 days and then added with stirring to 5 parts of methanol. Blue pigmentary copper phthalocyanine is obtained as a slurry in methanol. The pigment is isolated by filtering the slurry, washing the filter cake with water and then drying the washed filter cake, all in conventional fashion. The dry pigment obtained is quite intense in color and superior in tinting strength compared to either the starting crude or the dry milled pigment (before acid slurrying) and slightly surpasses in both strength and color intensity the product made from the same crude pigment according to the solvent milling method of U.S. Patent 2,556,727. The product is in the $\alpha$-phase (as defined in U.S. 2,556,728).

Example II

Example I is duplicated except that the hydrochloric acid slurry is diluted with water, rather than with methanol, to regenerate the copper phthalocyanine. The product obtained is much stronger and more intense in color than either the starting material or the dry milled pigment before acid treatment. In tinting strength and hue, the final product approximates the product of Example I.

*Example III*

Crude chlorine-free copper phthalocyanine is prepared by heating together phthalic anhydride, urea and copper (II) chloride in kerosene in the presence of ammonium molybdate catalyst, as described in U.S. 2,214,477. The crude copper phthalocyanine is milled in a ball mill with "Cyl-Pebs" as described in Example I. One (1) part of the milled powder is slurried at room temperature in 2 parts of commercial concentrated hydrochloric acid containing approximately 37% hydrogen chloride. A green color is formed on contact of the acid with the copper phthalocyanine, indicating chemical reaction. The acid slurry is maintained at room temperature for 4 days after which the copper phthalocyanine is regenerated by adding the slurry to 5 parts of methanol. The pigment is isolated in conventional fashion by filtering, washing, and drying.

The copper phthalocyanine pigment obtained is in the alpha crystal phase and has approximately three times the strength of the starting material. Compared to the corresponding product prepared as experimental control by milling the same starting crude copper phthalocyanine with sodium chloride and then isolating the pigment by extracting the salt and drying the extracted material, all as described in U.S. 2,402,167, the product of this example is equal in tinting strength, light in masstone, redder in hue and more intense in color. The product of this example is fully equal in strength to the strongest commercial copper phthalocyanine pigment known to us and is significantly stronger than most commercial counterparts.

*Example IV*

Crude chlorine-free copper phthalocyanine, prepared by the method described in the first sentence of Example III, is reduced in particle size to the pigmentary state by ball milling with steel shot in an acetone slurry by the method described in U.S. 2,556,727, and the product is isolated as a dry powder by extracting the mill slurry, following removal of acetone by distillation, with dilute sulfuric acid, then filtering, washing, and drying in conventional manner. One (1) part of the finished milled pigment is slurried in 2 parts of commercial concentrated hydrochloric acid and the mixture is allowed to stand for about 4 hours. The acid slurry is added with stirring to 5 parts of methanol and the regenerated copper phthalocyanine is isolated by filtering, washing, and drying. The product is markedly stronger and redder than the solvent milled material before treatment with hydrochloric acid. It is also much stronger than a control pigment prepared by salt milling (with extraction, washing, and drying) the same starting crude copper phthalocyanine according to U.S. 2,402,167. Thus, 80 parts of the product of the present example equal in tinting strength 100 parts of the salt milled counterpart, which in turn is equal in strength to the strongest commercial copper phthalocyanine known to me at this date.

*Example V*

Example I is repeated but with variation in concentration of the hydrochloric acid. Acid concentrations of 25 to 30% are obtained by diluting the commercial 37% hydrochloric acid. Hydrochloric acid of about 40% concentration is obtained by slurrying crude pigment in concentrated acid, as described in Example I, then cooling the slurry to 0° C. and saturating the slurry at 0° C. with gaseous hydrogen chloride. The tinting strengths of the products, relative to the starting crude are as follows:

| Concentration of hydrochloric acid (percent HCl): | Tinting strength vs. starting material |
|---|---|
| 25 | Approx. equal. |
| 30 | Slightly stronger. |
| 30 | Much stronger (40–50 parts=100 parts). |
| 40 | Much stronger (40–50 parts=100 parts). |

It is evident that a decrease in the acid concentration from 37% to 30% or 25% leads to marked decrease in strength.

*Example VI*

Example I is repeated except that 0.1 part of a non-ionic surface active agent (e.g., tridecyl alcohol polyglycol ether) is added to the acid slurry. The product obtained is significantly stronger than the corresponding material processed in the absence of the surfactant.

*Example VII*

Example I is repeated, but the copper phthalocyanine hydrochloride slurry is filtered to remove excess acid before regeneration of the copper phthalocyanine by dilution with methanol. The product obtained is slightly (about 3%) stronger than the product of Example I.

Removal of excess acid before regeneration of copper phthalocyanine from the hydrochloride is particularly advantageous when the regeneration is effected by diluting the hydrochloride with water. Repetition of Example I, but with filtration of the copper phthalocyanine hydrochloride slurry to remove excess acid before regenerating the copper phthalocyanine, and with regeneration of the copper phthalocyanine by mixing the hydrochloride with water, yields a product about 10% stronger than that of Example I.

*Modifications and equivalents.*—The process of this invention is applicable to copper phthalocyanine and to blue, water-insoluble, partially-substituted copper phthalocyanine compounds. Thus, for example, the process is applicable to partially chlorinated copper phthalocyanine and copper phthalocyanine compounds which contain minor proportions (i.e., not more than 4 equivalents per molecule) of substituents, such as nitro or sulfonic acid groups, which are used to confer desirable working properties or phase stability to copper phthalocyanine. The process is not applicable to the green highly chlorinated (45–50% chlorine) "polychloro" copper phthalocyanine.

In the operation of the process, it is preferred to use as starting material for the reaction with hydrochloric acid, a copper phthalocyanine compound of small crystallite size, such as material which has been reduced in crystallite size by milling. Particularly preferred as starting material are copper phthalocyanine compounds which have been dry milled or wet milled by the procedure of U.S. 2,556,727. However, the process is also applicable to unmilled copper phthalocyanine compounds. In general, the strength of the final product, after processing according to the invention, is greater the smaller the crystallite size of the starting material.

A wide variety of liquids can be used to regenerate the copper phthalocyanine compound from the reaction compound with hydrochloric acid. A preferred liquid is methanol, but liquid water, steam, ethanol, aqueous solutions of bases such as ammonia and amines and other liquids of sufficient basicity to convert copper phthalocyanine-hydrochloric acid reaction product to copper phthalocyanine, can also be used. Regeneration by reaction with gaseous ammonia has not given satisfactory results.

Agitation of the copper phthalocyanine hydrochloride slurry during regeneration of the copper phthalocyanine is desirable to obtain optimum pigment quality, but otherwise the conditions for the regeneration are not critical.

For optimum results, the time of contact of the hydrochloric acid with the pigment should be sufficient for reaction of substantially all of the copper phthalocyanine with the acid. The time required varies with the degree of sub-division of the copper phthalocyanine and the agitation used for effecting the necessary intimate contact between the solid and the liquid. Said optimum time can be readily determined by one skilled in the art. In practice, times in the range from 1 hour to 4 days give satisfactory results. Longer times are undesirable economically.

The ratio of hydrochloric acid to pigment should be sufficient to permit the slurry to be agitated. Larger quantities of acid give satisfactory results, but are not preferred for economic reasons. A preferred ratio is 2 parts of concentrated (37%) hydrochloric acid per part of copper phthalocyanine compound.

The method of synthesis of copper phthalocyanine for use in the process of the invention is not critical. It is convenient to use the phthalic anhydride-urea process, as described in Example I, but other methods can also be used.

As noted in Example V, the preferred hydrochloric acid concentration for the process is 37% (as HCl) but other concentrations above about 30% can also be used. At acid concentrations of 30% HCl, or less, optimum pigment strength is not obtained.

*Advantages.*—The process of the invention represents an economically attarctive method for conditioning copper phthalocyanine compounds to pigments of excellent tinctorial strength and intense color. The process offers the economic and operating advantages of an acid-swelling process for finishing copper phthalocyanine compounds, combined with the advantages of use of hydrochloric acid rather than the sulfuric acid used hitherto. With hydrochloric acid, dilution of the acid slurry to regenerate the copper phthalocyanine compound does not produce the strong exothermal effects which are a source of serious difficulty when sulfuric acid is used. In the absence of adequate control of these effects with sulfuric acid, pigment quality is adversely affected, as described in U.S. 2,524,672. With the use of hydrochloric acid in the process rather than sulfuric acid, these excessive heat effects are avoided.

Another advantage of the process of this invention is that a wide variety of surfactants are stable in hydrochloric acid, thus permitting their use to enhance pigment quality, whereas organic surfactants in general are inoperative, or oxidized, or decomposed in strong sulfuric acid.

A further advantage is that the process of this invention does not introduce sulfate residues into the pigment.

A still further advantage of the process of the invention over the prior art process involving use of sulfuric acid is in easier control of corrosion. With the process of the invention, corrosion problems can be brought under control simply by the use of equipment lined with rubber, or other polymeric material which is essentially inert to hydrochloric acid, whereas with use of sulfuric acid, such simple equipment is not suitable because of pronounced thermal effects when the acid is diluted and because of the chemical action of strong sulfuric acid.

I claim as my invention:

1. A process for producing pigmentary copper phthalocyanine exhibiting enhanced tinctorial characteristics and pigmentary strength through the acid swelling of a blue, water-insoluble copper phthalocyanine compound, which comprises slurrying a crude form of said compound in aqueous hydrochloric acid of not less than 30% and up to 40% HCl concentration to form a hydrochloride of said copper phthalocyanine compound, and then regenerating the pigment from said hydrochloride by treating the slurried product with a proton acceptor selected from the group consisting of methanol, ethanol, water, steam, aqueous ammonia and aqueous solutions of organic amines.

2. A process for producing a blue, water-insoluble copper phthalocyanine compound in a pigmentary state of high tinctorial strength, which comprises subjecting a crude form of said compound to dry milling to reduce its particle size, slurrying the milled product in aqueous hydrochloric acid of not less than 30% and up to 40% HCl concentration to form a hydrochloride of said copper phthalocyanine compound, and then regenerating the pigment from said hydrochloride by treating the slurried product with a proton acceptor selected from the group consisting of methanol, ethanol, water, steam, aqueous ammonia and aqueous solutions of organic amines.

3. A process as in claim 2, wherein the copper phthalocyanine compound is selected from the group consisting of unsubstituted copper phthalocyanine and copper phthalocyanine substituted, to a degree not exceeding four equivalents per molecule, with a substituent selected from the group consisting of chloro, nitro and sulfo.

4. A process as in claim 2, wherein the regeneration is effected by treating the slurried pigment with a proton acceptor selected from the group consisting of methanol, ethanol, water, steam, aqueous ammonia and aqueous solutions of organic amines.

5. A process of producing pigmentary copper phthalocyanine exhibiting enhanced tinctorial characteristics and pigmentary strength, which comprises slurrying a dry milled copper phthalocylanine in crude form in aqueous 37% concentrated hydrochloric acid at room temperature and in the ratio of about 1:2 by weight until a hydrochloride of copper phthalocyanine has been formed, and then reacting the slurried product with methanol to regenerate the free pigment subdivided into extremely fine crystals which possess high tinctorial strength.

6. A process of producing pigmentary copper phthalocyanine exhibiting enhanced tinctorial characteristics and pigmentary strength, which comprises slurrying a dry milled copper phthalocyanine in crude form in aqueous 37% concentrated hydrochloric acid at room temperature and in the ratio of about 1:2 by weight until a hydrochloride of copper phthalocyanine has been formed, removing excess acid, and treating the residual mass with water to regenerate copper phthalocyanine subdivided into extremely fine crystals which possess high tinctorial strength.

References Cited by the Examiner

UNITED STATES PATENTS

| | | | |
|---|---|---|---|
| 2,524,672 | 10/1950 | Lecher et al. | 260—314.5 |
| 2,857,400 | 10/1958 | Cooper | 260—314.5 |
| 2,999,862 | 9/1961 | Geiger | 260—314.5 |
| 3,051,718 | 8/1962 | Wheeler | 260—314.5 |
| 3,051,720 | 8/1962 | Minnich | 260—314.5 |

OTHER REFERENCES

Fiat Final Report No. 1313, vol. III (February 1958), pages 298–302.

WALTER A. MODANCE, *Primary Examiner.*

JAMES A. PATTEN, *Assistant Examiner.*